Figure 1:
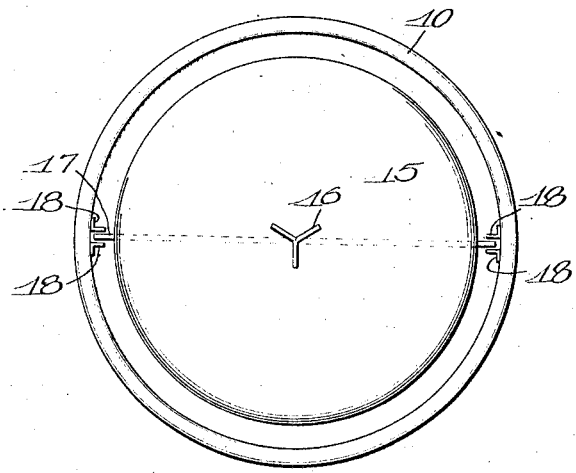

C. H. HACKETT & T. W. MORGAN.
FEED DEVICE FOR CENTRIFUGAL SEPARATORS.
APPLICATION FILED APR. 13, 1908.

967,372.

Patented Aug. 16, 1910.

Witnesses:
Robert H. Weir
N. L. Sprinkee

Inventors
C. H. Hackett
T. W. Morgan
By Brown & Hopkins
Attys

UNITED STATES PATENT OFFICE.

CHARLES H. HACKETT AND THOMAS W. MORGAN, OF WATERLOO, IOWA, ASSIGNORS TO WILBUR W. MARSH, OF WATERLOO, IOWA.

FEED DEVICE FOR CENTRIFUGAL SEPARATORS.

967,372.   Specification of Letters Patent.   Patented Aug. 16, 1910.

Application filed April 13, 1908. Serial No. 426,658.

*To all whom it may concern:*

Be it known that we, CHARLES H. HACKETT and THOMAS W. MORGAN, citizens of the United States, residing at Waterloo, in the county of Blackhawk and State of Iowa, have invented certain new and useful Improvements in Feed Devices for Centrifugal Separators, of which the following is a full, clear, and exact specification.

The invention relates to centrifugal cream separators but more especially to the feeding device for regulating the flow of milk into the separator bowl.

The primary object of the invention is to secure an improved form of feeding device for centrifugal cream separators adapted to produce a uniform flow of milk into the separator bowl.

A further object of the invention is to produce an improved form of feeding device for centrifugal cream separators which shall be simple and efficient in construction and adapted to discharge a uniform stream of fluid unchanged by a circular or gyrating movement within the supply cup or conduit which feeds into the bowl.

A still further object of the invention is to provide a float controlled feeding device of the character described with improved means whereby a uniform flow of fluid from the feeding device may be secured, said flow being unchanged by a vortex formed in the feed cup or conduit by a circular or gyratory movement of the fluid.

It has been observed that when milk is discharged into the feed or supply cup, particularly when the flow from the cup is controlled by a float, that the milk is apt to take a circular or gyratory movement within the cup and this movement interferes with the uniform flow from the cup even when the discharge hole therein is made with the greatest accuracy. Under such conditions the flow from the cup may be found to assume the form of a fan shape and in an instant change into a snake-like movement as it drops from the cup, and again it is observed to change into a kind of spraying movement, dropping from the cup like rain. Observations have shown that these various changes in the flow of milk upon being discharged from the cup are due to the circular or gyratory movement by which the milk is formed in a vortex in the cup itself. It is found that when this circular or gyratory movement of the milk within the cup is stopped the flow from the cup becomes uniform, tube-like in form, and the quantity discharged varies little or none at all, while if left uncontrolled in the cup to take on a circular or gyratory movement, the discharge varies greatly.

When the feed or flow of milk to the bowl is not uniform in quantity it is found that the density of the cream is affected, that the bowl is apt to clog and an improper separation of the fluid is likely to result. The two elements which enter into the proper separation of milk are time and pressure and both can be estimated when there is an even feed of the supply into the bowl. If, however, the supply is diminished, the length of time that the fluid is under pressure is increased, and if the supply is increased, the length of time that the liquid is under pressure is decreased. When variations in either direction occur a change in the density of the cream occurs or the other difficulties enumerated are likely to be the result.

In the development of the centrifugal separator during the past few years the tendency has been toward the use of smaller bowls. For example, it is only a comparatively short time since a separator bowl necessary to skim five hundred pounds of milk per hour carried when filled to a normally operative degree, forty-five to sixty ounces of milk, while at the present time a bowl normally carrying only from six to fifteen ounces of milk is employed to skim a like quantity or a like number of pounds per hour. When the size of the bowl is decreased, the pressure of air on the bowl and consequently the friction is proportionately decreased and a lighter running machine to do a given amount of work is secured. It was a comparatively easy thing to feed fluid into a bowl of such large capacity as formerly used where the amount of work to be done was proportionately so limited. But it is found that with the use of smaller bowls new problems have arisen, one of which is the necessity for securing an improved feeding device adapted to supply the fluid to the bowl in a uniform stream and to secure an improved device capable of satisfactorily performing this desirable result is the chief object of the invention.

To the attainment of these ends and the accomplishment of other new and useful objects, the invention consists in the features of novelty hereinafter described, pointed out more specifically in the appended claims and shown in the accompanying drawings forming a part of this specification.

Figure 2:
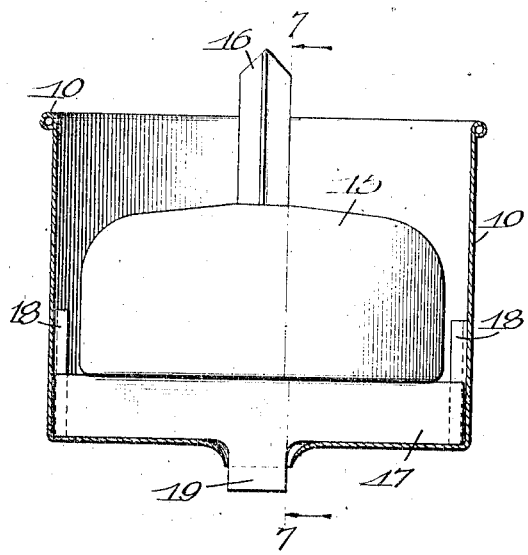

Figure 1 is a plan view of a feed cup provided with a float to which the invention is shown applied. Fig. 2 is a sectional view of the device as it appears in Fig. 1, and Fig. 3 is a section on line 7—7, Fig. 2.

The reference character 10 indicates a feed cup of ordinary construction, the bottom of which is provided with a discharge orifice, as indicated at 11. These feed cups or conduits appear in the centrifugal separator art in a variety of forms. The invention may be applied to any common form of cup or conduit. In this embodiment of the invention, no specific means is shown for supporting the cup in relation to the bowl, but the cups may be supported in a variety of ways, as for example, secured to the top of the casing surrounding the bowl.

Figure 3:
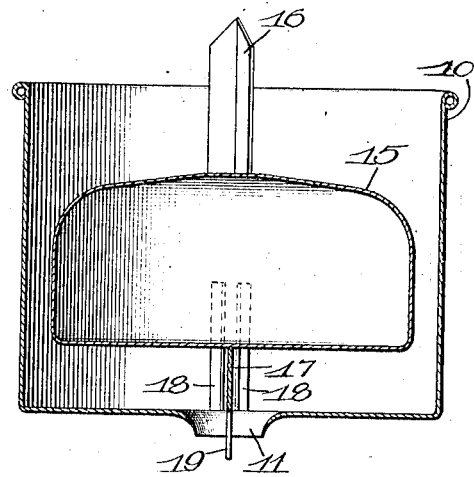

In the form of the invention shown in Figs. 1 to 3 inclusive, 15 is a float of ordinary form, and 16 a vane extending upwardly from the center thereof adapted to enter the discharge nozzle or spout from a supply can or tank. This float is designed to operate in the usual manner to control the discharge of fluid from the supply can into the feed cup, the flow into the feed cup being regulated by the rising and falling of the float, the member 16 guiding the float so that it may vary the discharge of fluid from the supply can as it rises and falls within the feed cup.

The partition or wall indicated by the reference character 17 is shown secured to the bottom of the float and is consequently adapted to rise and fall therewith. To prevent the rotation of the member 17 within the cup, suitable guides 18 are secured to the walls of the cup 11. To prevent the device from becoming inoperative as the member 17 rises and falls with the float, the tongue, as indicated at 19, is formed on the member 17 preferably integral therewith and projects into and below the mouth of the discharge orifice so that as the float rises a portion of the depending tongue 19 will still remain adjacent the orifice and check any tendency toward gyratory or circular movement the fluid may have in passing through the discharge orifice.

It will be apparent that with a feed cup provided with a wall or partition near the bottom thereof and adjacent the discharge orifice that it will be impossible for fluid within the cup to have a circulatory or gyratory movement, particularly at the moment of discharge and it is found that with a device constructed as described, a uniform and steady flow of the fluid through the discharge orifice into the bowl is secured.

In order that the invention might be fully understood the details of the preferred embodiment thereof have been thus specifically described, and it will be apparent that many modifications may be made by those skilled in the art without departing from the purpose and spirit of the invention, but

What we claim is—

1. The combination in a feed tank provided with a feed orifice, of a partition or wall located in relation to the orifice so as to prevent the gyration of fluids passing through the same, and a float within such tank secured to and supporting the partition.

2. The combination in a feed tank provided with a feed orifice, of a partition or wall located in relation to the orifice so as to prevent the gyration of fluids passing through the same, guides for such partition, and a float within the tank supporting such partition.

3. In a feed device for centrifugal separators, in combination, a conduit or receptacle provided with a feed orifice, a float, and a partition or wall within the conduit or receptacle and secured against rotation on an axial line substantially parallel with the general direction of movement of the fluid through the said device, whereby the gyration of fluids within the conduit or receptacle may be prevented.

In testimony whereof we have signed our names to this specification, in the presence of two subscribing witnesses, on this 9th day of April A. D. 1908.

CHARLES H. HACKETT.
THOMAS W. MORGAN.

Witnesses:
EMMA RODAMAR,
W. J. McGARVY.